US008023914B2

(12) United States Patent
Ruan et al.

(10) Patent No.: US 8,023,914 B2
(45) Date of Patent: Sep. 20, 2011

(54) METHOD FOR DETERMINING REGION WHERE BROADCASTING RECEIVER IS LOCATED

(75) Inventors: Shiau-Shiu Ruan, Taipei (TW); Shu-Yi Chen, Taipei (TW); Chang-Hung Lee, Dounan Township, Yunlin County (TW)

(73) Assignee: Qlada Corporation, Taoyuan County (TW)

( * ) Notice: Subject to any disclaimer, the term of this patent is extended or adjusted under 35 U.S.C. 154(b) by 904 days.

(21) Appl. No.: 12/010,853

(22) Filed: Jan. 30, 2008

(65) Prior Publication Data

US 2008/0182533 A1 Jul. 31, 2008

(30) Foreign Application Priority Data

Jan. 31, 2007 (TW) .............................. 96103461 A

(51) Int. Cl.
*H04B 1/18* (2006.01)

(52) U.S. Cl. ................................. 455/185.1; 455/161.3

(58) Field of Classification Search ............... 455/161.1, 455/161.2, 161.3, 179.1, 184.1, 185.1, 186.1
See application file for complete search history.

(56) References Cited

U.S. PATENT DOCUMENTS

| | | | | |
|---|---|---|---|---|
| 5,086,511 | A * | 2/1992 | Kobayashi et al. | 455/156.1 |
| 5,280,642 | A | 1/1994 | Hirata et al. | |
| 5,393,713 | A * | 2/1995 | Schwob | 455/158.5 |
| 5,603,108 | A * | 2/1997 | Thoone | 455/186.1 |
| 6,393,294 | B1 * | 5/2002 | Perez-Breva et al. | 455/456.5 |
| 2002/0080895 | A1 | 6/2002 | Lindberg | |
| 2008/0028429 | A1 | 1/2008 | Nakamura | |

FOREIGN PATENT DOCUMENTS

| | | |
|---|---|---|
| EP | 0762679 A1 | 3/1997 |
| TW | I255649 | 5/2006 |

* cited by examiner

*Primary Examiner* — Nguyen Vo

(57) ABSTRACT

The invention discloses a method for determining a region where a broadcasting receiver is located by detecting the signal strength of a plurality of channels. When a user takes the broadcasting receiver from region A to region B, the broadcasting receiver provides a list of regions including region B when the broadcasting receiver is turned on. When the user chooses to change the current region to region B, and after the channel scan is performed, the user can effortlessly view the broadcast programs of region B.

20 Claims, 5 Drawing Sheets

| Country | Germany | Iceland | Italy | Norway | Portugal | Spain | Sweden | Taiwan | Britain |
|---|---|---|---|---|---|---|---|---|---|
| Frequency | UHF: 474MHz~ 858MHz VHF : 177.5MHz~ 226.5MHz | UHF: 474MHz~ 858MHz | UHF: 474MHz~ 858MHz VHF : 177.5MHz~ 226.5MHz | UHF: 474MHz~ 858MHz | UHF: 474MHz~ 858MHz | UHF: 474MHz~ 858MHz | UHF: 474MHz~ 858MHz | UHF : 473MHz~ 857MHz | UHF: 474MHz~ 858MHz |
| Bandwidth | UHF: 8MHz VHF: 7MHz | UHF: 8MHz | UHF: 8MHz VHF: 7MHz (8MHz for VHF later) | 8MHz | 8MHz | 8MHz | 8MHz | 6MHz | 8MHz |
| Carrier type | 8K | 8K | 8K | 8K | 8K | 8K | 8K | 8K | 2K |
| Guard interval | 1/8 | 1/8 | 1/32 | N/A | 1/4 during trial | 1/4 | 1/8 | 1/8 | 1/32 |
| Forward error correction | 2/3 & 3/4 | 2/3 & 3/4 | UHF: 2/3 VHF: 3/4 | N/A | 2/3 during trial | 2/3 | 2/3 | 1/2 mainly, some 3/4 | 16QAM: 3/4 64QAM: 2/3 |
| Modulation type | 16QAM | 16QAM | 64QAM | 64QAM | 64QAM | 64QAM | 64QAM | 16QAM | 16QAM, 64QAM |

FIG. 1 (prior art)

METHOD FOR DETERMINING REGION WHERE BROADCASTING RECEIVER IS LOCATED

BACKGROUND OF THE INVENTION

1. Field of the invention

The invention relates to a method for a broadcasting receiver determining a region where the broadcasting receiver is located and, more particularly, to a method for detecting signal strengths of plural channels so as to determine a region where the broadcasting receiver is located.

2. Description of the Prior Art

Please refer to FIG. 1. FIG. 1 shows a table of parameters related to broadcasting regions. At present, digital video broadcasting (DVB) signals in different countries vary in frequencies and bandwidths. In general, if a broadcasting receiver is to receive a DVB signal in a certain country, the broadcasting receiver has to be set not only the corresponding frequency and bandwidth, but also other corresponding parameters, such as a carrier type, a guard interval, a forward error correction, and a modulation type, according to the situation of the country. As shown in FIG. 1, the frequency of Taiwan is 473 MHz~857 MHz, and the bandwidth is 6 MHz. The table of parameters is stored in the broadcasting receiver. If the parameters of a region are wrongly set, the broadcasting receiver can not receive DVB signal correctly.

For example, when a user carries the broadcasting receiver from Taiwan to Britain, the user should change the region setting from Taiwan to Britain and then perform channel scan, so as to receive the broadcast programs in Britain.

Conventional broadcasting receiver has to be manually operated via an operation menu to change region setting and perform channel scan. It is very inconvenient for a user to perform such complicated operations. Besides, when the broadcasting receiver can not receive signals, the user would not know whether it is because of the change of region or poor signal, so the user can not judge whether he or she should change the parameters of region or not.

Accordingly, a scope of the invention is to provide a method for determining a region in a broadcasting receiver to solve the aforesaid problems.

SUMMARY OF THE INVENTION

A scope of the invention is to provide a method for a broadcasting receiver determining a region where the broadcasting receiver is located. Thereby, the broadcasting receiver is capable of automatically determining the region where the broadcasting receiver is located.

According to an embodiment, the method of the invention is used for a broadcasting receiver determining a region where the broadcasting receiver is located. The broadcasting receiver stores a plurality of candidate regions, and each of the regions includes a plurality of assigned channels. The method of the invention includes the following steps.

At first, when the broadcasting receiver is turned on, the method detects a signal strength of a current channel assigned in the current region, and determines whether the signal strength of the current channel is smaller than a first threshold.

If the signal strength of the current channel is larger than or equal to the first threshold, the method does nothing. If the signal strength of the current channel is smaller than the first threshold, the method detects a signal strength of a second channel assigned in the current region, and determines whether the signal strength of the second channel is smaller than a second threshold.

If the signal strength of the second channel is larger than or equal to the second threshold, the method does noting. If the signal strength of the second channel is smaller than the second threshold, the method detects a signal strength of a third channel assigned in one of the candidate regions other than the current region, and determines whether the signal strength of the third channel is smaller than a third threshold. Then, the method performs above process for each of the plurality of candidate regions stored in the broadcasting receiver. If any of the signal strength of a detected region is larger than or equal to the third threshold, the method records the detected region.

If none of the candidate regions is recorded, the method does nothing. If one of the candidate regions is recorded, the method then defines the recorded region as the current region.

Accordingly, the method of the invention automatically determines the region where the broadcasting receiver is located by detecting signal strengths of channels assigned in plural candidate regions. In other words, when a user carries a broadcasting receiver from a region A to a region B, the broadcasting receiver provides a list of regions including region B when the broadcasting receiver is turned on. When the user chooses to change the current region (from region A) to region B and perform channel scan, the user can effortlessly view broadcast programs of region B.

The advantage and spirit of the invention may be understood by the following recitations together with the appended drawings.

BRIEF DESCRIPTION OF THE APPENDED DRAWINGS

FIG. 1 shows a table of parameters related to broadcasted regions.

FIG. 3 shows a dialog window of the list of regions for a user to choose from.

DETAILED DESCRIPTION OF THE INVENTION

Figure 2A:
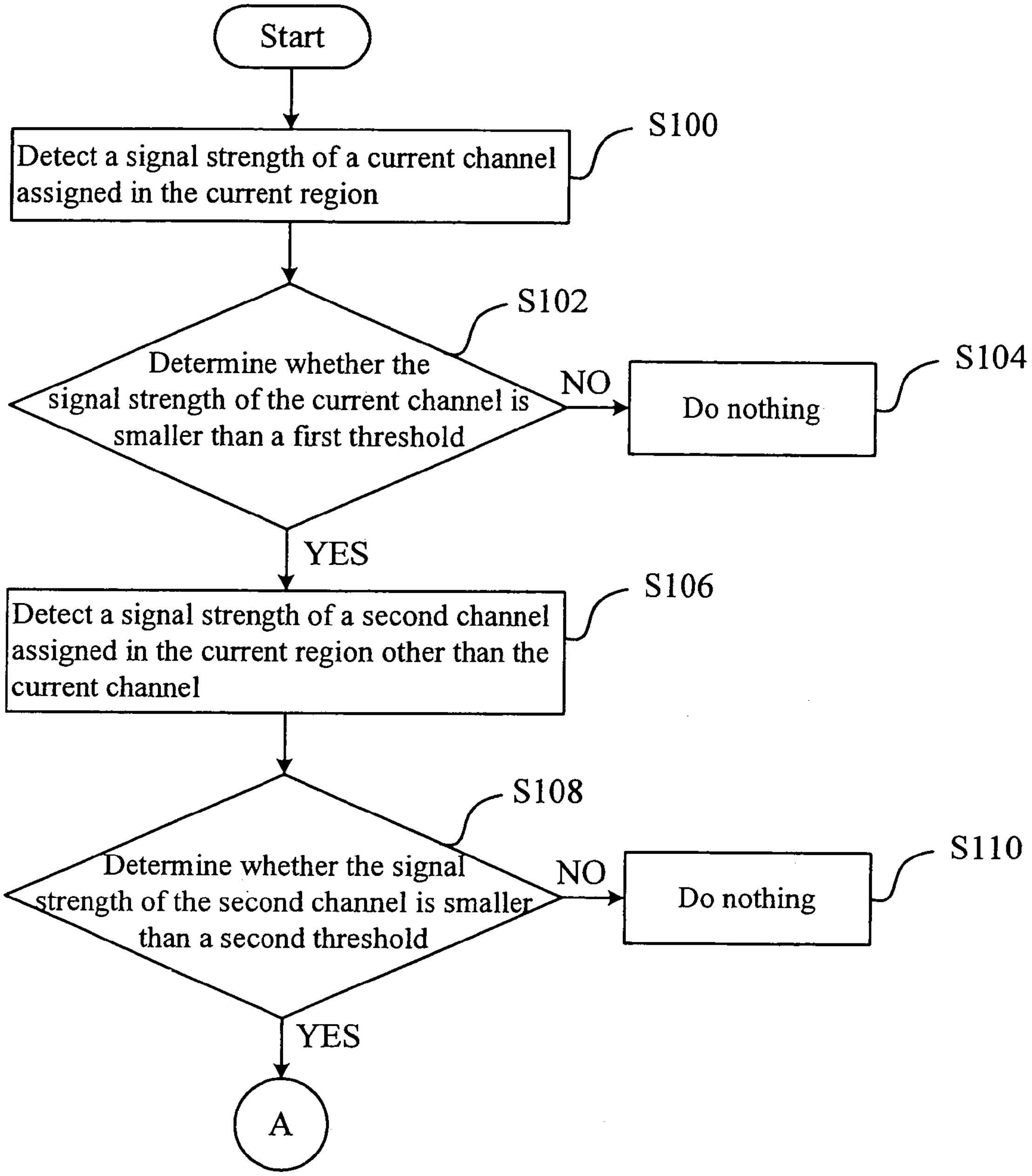
FIG. 2A and FIG. 2B show the flow chart of the method according to an embodiment of the invention.
Figure 2B:
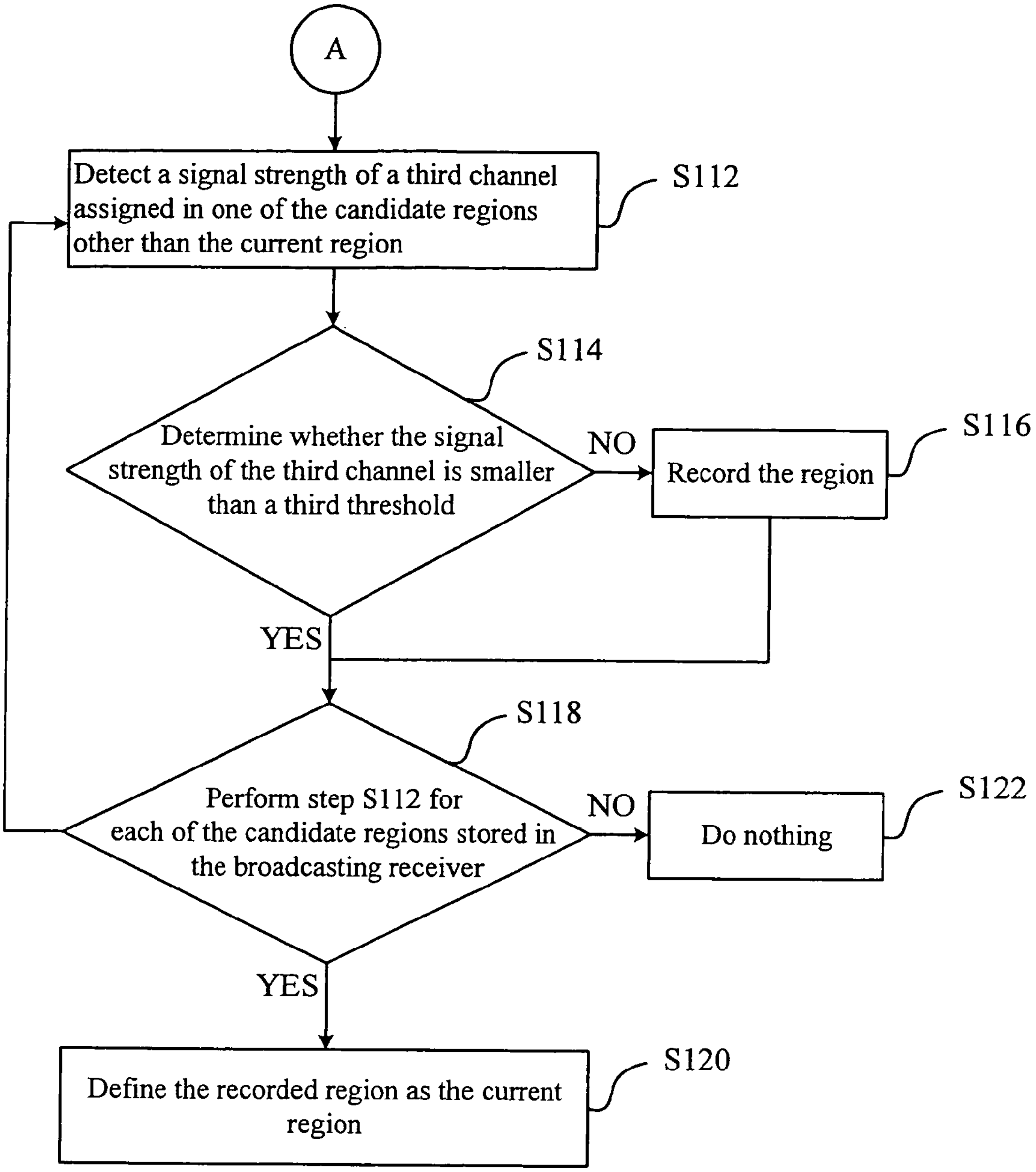
Figure 3:
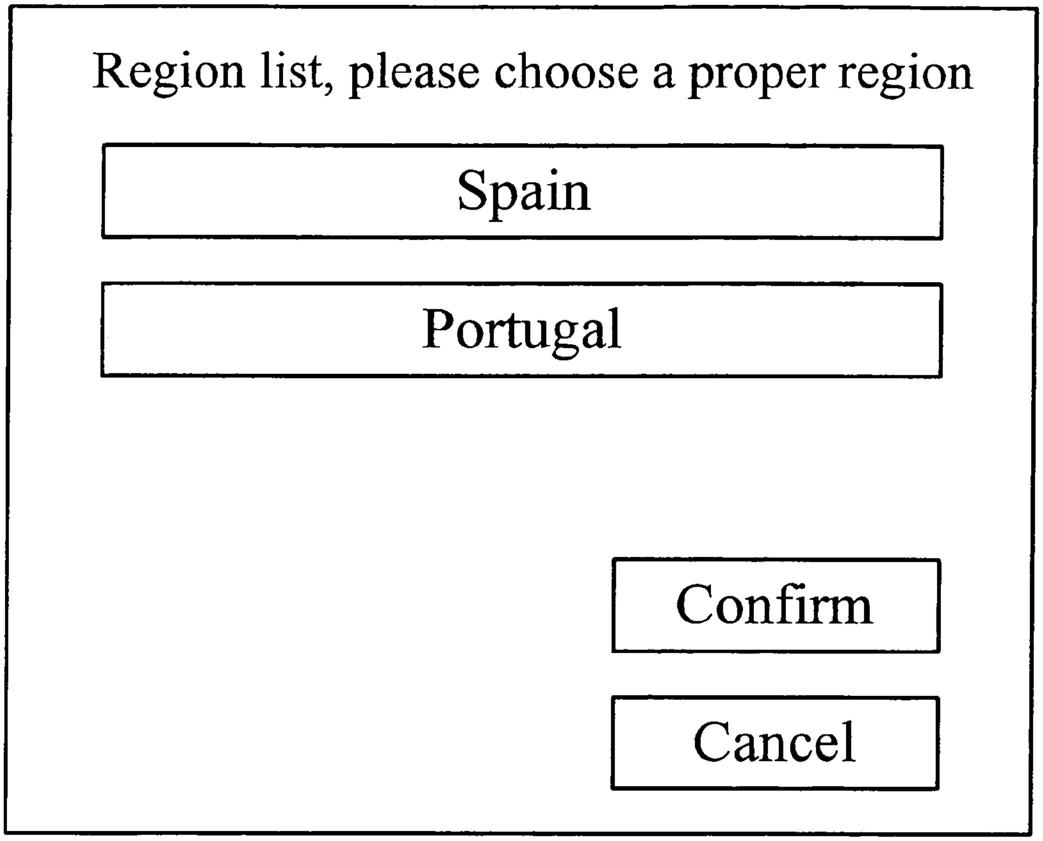

Please refer to FIG. 2A through FIG. 3. FIG. 2A and FIG. 2B show the flow chart of the method according to an embodiment of the invention. FIG. 3 shows a dialog window of the list of regions for a user to choose from. In the embodiment, the method of the invention is used for a broadcasting receiver (not shown) determining a region where the broadcasting receiver is located. The broadcasting receiver stores a plurality of candidate regions, and each of the candidate regions includes a plurality of assigned channels. In the embodiment, the broadcasting receiver can be a portable digital TV. The current channel of the current region can be, but not limited to, the channel of the region being presented when the broadcasting receiver is turned off.

As shown in FIG. 2A and FIG. 2B, the method of the invention includes the following steps. At first, when the broadcasting receiver is turned on, the method performs step S100 to detect a signal strength of a current channel assigned in the current region. Then, the method performs step S102 to determine whether the signal strength of the current channel is smaller than a first threshold, and if NO, performs step S104, if YES, performs step S106.

Step S104 is doing nothing, which means that the region where the broadcasting receiver is located is not changed and the broadcasting receiver can receive signal correctly. Accordingly, the broadcasting receiver does not have to perform the following steps to change the current region or current channel.

Step S106 is detecting a signal strength of a second channel assigned in the current region other than the current channel, and then performing step S108 to determine whether the signal strength of the second channel is smaller than a second threshold. If the determined result of step S108 is NO, the method performs step S110, if the determined result of step S108 is YES, then the method performs step S112. In the embodiment, the second channel can be, but not limited to, the next adjacent channel of the current channel, the previous adjacent channel of the current channel, the theoretically foremost channel of the current region, the theoretically aftermost channel of the current region, or the channel assigned in the current region with the frequency located in the middle of the frequency band.

Step S110 is doing noting, which means that the region where the broadcasting receiver is located is not changed, but the signal receiving of the current channel is poor. Therefore, the broadcasting receiver does not have to change the current region, but it might automatically change the current channel. The user can choose to switch to another channel of the current region.

Step S112 is detecting a signal strength of a third channel assigned in one of the candidate regions other than the current region, and then performing step S114 to determine whether the signal strength of the third channel is smaller than a third threshold. If the determined result of step S114 is YES, the method performs step S118, if the determined result is NO, then the method performs step S116.

In the embodiment, the third channel can be a foremost channel or any channel with a particular frequency assigned in the one candidate region. For example, the third channel can be the aftermost channel assigned in the region, the channel with the strongest signal strength, a popular channel (such as the CNN), or another particular channel.

Step S116 is recording the region, and then step S118 is performed.

Step S118 is performing step S112 for each of the candidate regions stored in the broadcasting receiver, until either all the plurality of candidate regions being detected once, or at least one of the candidate regions is recorded. If at least one of the candidate regions is recorded, the method performs step S120 to define the recorded region as the current region. For example, if a signal strength of each of the detected channels of a second and a third regions are both smaller than the third threshold, and a signal strength of a detected channel of a fourth region is larger than the third threshold, the broadcasting receiver can process one of the following two steps: (1) directly setting the fourth region as the current region, or (2) displaying the fourth region as the "recommended region" for user to choose. In actual applications, if the "recommended regions" are plural, the user can choose one from the plural "recommended regions" via the dialog window, as shown in FIG. 3. For example, if the signal strengths of the third and fourth regions are both larger than the third threshold, the third and fourth regions will both be shown on the dialog window, as shown in FIG. 3.

If none of the regions is recorded, the method performs step S122 to do nothing. That means that the signal, of the region where the broadcasting receiver is located can not be received, so the current region does not need to be changed.

In the embodiment, the first, second and third thresholds can be the same threshold. And noticeably, the first, second and third thresholds can be designed by the designers according to actual requirements.

Figure 4:
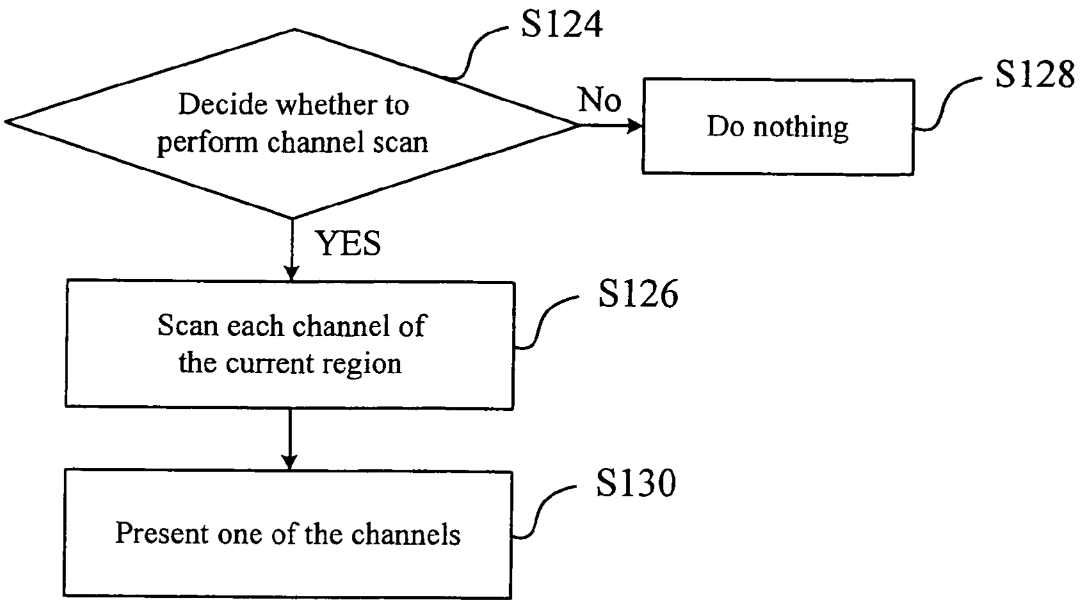
FIG. 4 shows a flow chart of the process for deciding whether to perform channel scan.
Figure 5:
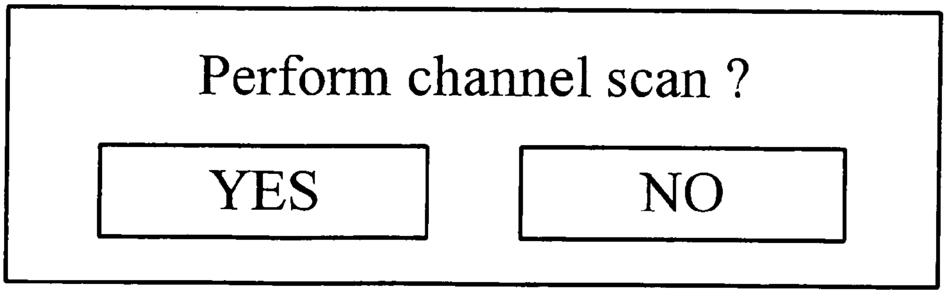
FIG. 5 shows the dialog window for choosing whether to perform channel scan.

Please refer to FIG. 4 and FIG. 5. FIG. 4 shows a flow chart of the process for deciding whether to perform channel scan. FIG. 5 shows the dialog window for choosing whether to perform channel scan. As shown in FIG. 4, the method according to the invention can further perform step S124 to decide whether to perform channel scan or not, and if YES, performs step S126, if NO, performs step S128. In practice, the user can choose whether to perform channel scan via the dialog window shown in FIG. 5. Step S126 is scanning each of the assigned channels of the current region. Step S128 is doing nothing. If the user decides to perform channel scan, the method further performs step S130 to present one of plural available channels assigned in the current region. It is noticeable that the one channel to be presented is determined by the broadcasting receiver. Through the channel scan, the broadcasting receiver scans each of assigned channels of the current region, and judges whether the scanned assigned channel actually has a program signal. Then, the broadcasting receiver records each scanned assigned channel having a program signal for the user to choose later. The user can press the "channel+" and "channel−" buttons to switch to the previous or the next channel having the program signal.

In the embodiment, the broadcasting receiver stores a plurality of sets of parameters, and each of the sets of parameters respectively defines one of the candidate regions, as shown in FIG. 1. Each of the sets of parameters can include a carrier type, a guard interval, a forward error correction, a modulation type, a frequency, or a bandwidth. In other words, the broadcasting receiver needs to set the particular parameters that define a particular region, so as to receive the broadcasting signal in the particular region.

Comparing with the prior art, the method of the invention automatically determines the region where the broadcasting receiver is by detecting signal strength of channels of regions. In other words, when a user carries a broadcasting receiver from a region A to a region B, the broadcasting receiver provides a list of regions including region B when the broadcasting receiver is turned on. When the user chooses to change the current region (from region A) to region B and performs channel scan, the user will be able to watch broadcast programs of region B.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for a broadcasting receiver determining a current region where the broadcasting receiver is located, the broadcasting receiver storing a plurality of candidate regions, each of the plurality of candidate regions comprising a plurality of assigned channels, the method comprising steps of:

(a) when the broadcasting receiver is turned on, detecting a signal strength of a current channel assigned in the current region, wherein when the signal strength of the current channel is smaller than a first threshold, performing step(b);

(b) detecting a signal strength of a second channel assigned in the current region other than the current channel, wherein when the signal strength of the second channel is smaller than a second threshold, performing step (c);

(c) detecting a signal strength of a third channel assigned in one of the candidate regions other than the current region, and determining whether the signal strength of the third channel is smaller than a third threshold, when the signal strength of the third channel is smaller than a third threshold, performing step (d) directly, when the signal strength of the third channel is larger than the third threshold or equal to the third threshold, recording the detected candidate region and then performing step (d);

(d) performing step (c) for each of the plurality of candidate regions stored in the broadcasting receiver, until either all the plurality of candidate regions being detected once, or one of the candidate regions is recorded; and (e) when one of the candidate regions is recorded, defining the recorded region as the current region.

2. The method of claim 1, when a user chooses to perform channel scan for the current region, further comprising steps of:

(f) via the broadcasting receiver, scanning each of the assigned channels of the current region, and judging whether the scanned assigned channel actually has a program signal; and (g) via the broadcasting receiver, recording each scanned assigned channel having a program signal for the user to choose later.

3. The method of claim 1, wherein the current channel of the current region is the channel to be presented when the broadcasting receiver is turned on.

4. The method of claim 1, wherein in step (b), the second channel other than the current channel is adjacent to the current channel.

5. The method of claim 1, wherein in step (c), the third channel is one selected from the group consisting of a foremost channel assigned in the one candidate region and a channel with a particular frequency assigned in the one candidate region.

6. The method of claim 1, wherein the broadcasting receiver stores a plurality of sets of parameters, each of the sets of parameters respectively defines one of the plurality of candidate regions.

7. The method of claim 6, wherein each of the sets of parameters comprises at least one selected from the group consisting of a carrier type, a guard interval, a forward error correction, a modulation type, a frequency, and a bandwidth.

8. A method for a broadcasting receiver determining a current region where the broadcasting receiver is located, the broadcasting receiver being capable of receiving a broadcast in a first region and a second region, a first channel and a second channel being assigned in the first region, a third channel being assigned in the second region, the method comprising steps of:

(a) via the broadcasting receiver, setting the first region as the current region;

(b) via the broadcasting receiver, detecting a signal strength of the first channel of the current region, a wherein when the signal strength of the first channel is smaller than a first threshold, performing step (c);

(c) detecting a signal strength of the second channel assigned in the current region, wherein when the signal strength of the second channel is smaller than the first threshold, performing step (d); and (d) detecting a signal strength of the third channel assigned in the second region, wherein when the signal strength of the third channel is larger than the first threshold, setting the second region as the current region.

9. The method of claim 8, when a user chooses to perform channel scan for the current region, further comprising steps of (e) via the broadcasting receiver, scanning each channel assigned in the current region, and judging whether the scanned channel actually has a program signal; and (f) via the broadcasting receiver, recording each scanned channel having the program signal for the user to choose from later.

10. The method of claim 8, wherein the first channel is the channel to be presented when the broadcasting receiver is turned on.

11. The method of claim 8, wherein the second channel is adjacent to the first channel.

12. The method of claim 8, wherein the third channel is one selected from the group consisting of a foremost channel assigned in the second region and a channel with a particular frequency assigned in the second region.

13. The method of claim 8, wherein the broadcasting receiver stores a first set of parameters and a second set of parameters, the first and second sets of parameters define the first and second regions, respectively, each of the first and second sets of parameters comprises at least one selected from the group consisting of a carrier type, a guard interval, a forward error correction, a modulation type, a frequency, and a bandwidth.

14. A method for a broadcasting receiver determining a recommended region where the broadcasting receiver is located, the broadcasting receiver being capable of receiving a broadcast in a first region and a second region, a first channel and a second channel being assigned in the first region, a third channel being assigned in the second region, the method comprising steps of:

(a) via the broadcasting receiver, setting the first region as the recommended region;

(b) via the broadcasting receiver, detecting a signal strength of the first channel of the recommended region, wherein when the signal strength of the first channel is smaller than a first threshold, performing step (c);

(c) detecting a signal strength of the second channel assigned in the recommended region, wherein when the signal strength of the second channel is smaller than the first threshold, performing step (d);

(d) detecting a signal strength of the third channel assigned in the second region, wherein when the signal strength of the third channel is larger than the first threshold, setting the second region as the recommended region; and (e) via the broadcasting receiver, displaying the recommended region for a user to choose.

15. The method of claim 14, when the user chooses the recommended region, further comprising step of:

(f) via the broadcasting receiver, setting the recommended region as a current region.

16. The method of claim 15, when the user chooses to perform channel scan for the current region, further comprising steps of :

(g) via the broadcasting receiver, scanning each channel assigned in the current region, and judging whether the scanned channel actually has a program signal; and (h) via the broadcasting receiver, recording each scanned channel having the program signal for the user to choose later.

17. The method of claim 14, wherein the first channel is the channel to be presented when the broadcasting receiver is turned on.

18. The method of claim 14, wherein the second channel is adjacent to the first channel.

19. The method of claim 14, wherein the third channel is one selected from the group consisting of a foremost channel assigned in the second region and a channel with a particular frequency assigned in the second region.

20. The method of claim 14, wherein the broadcasting receiver stores a first set of parameters and a second set of parameters, the first and second sets of parameters define the first and second regions, respectively, each of the first and second sets of parameters comprises at least one selected from the group consisting of a carrier type, a guard interval, a forward error correction, a modulation type, a frequency, and a bandwidth.

* * * * *